United States Patent Office
3,231,459
Patented Jan. 25, 1966

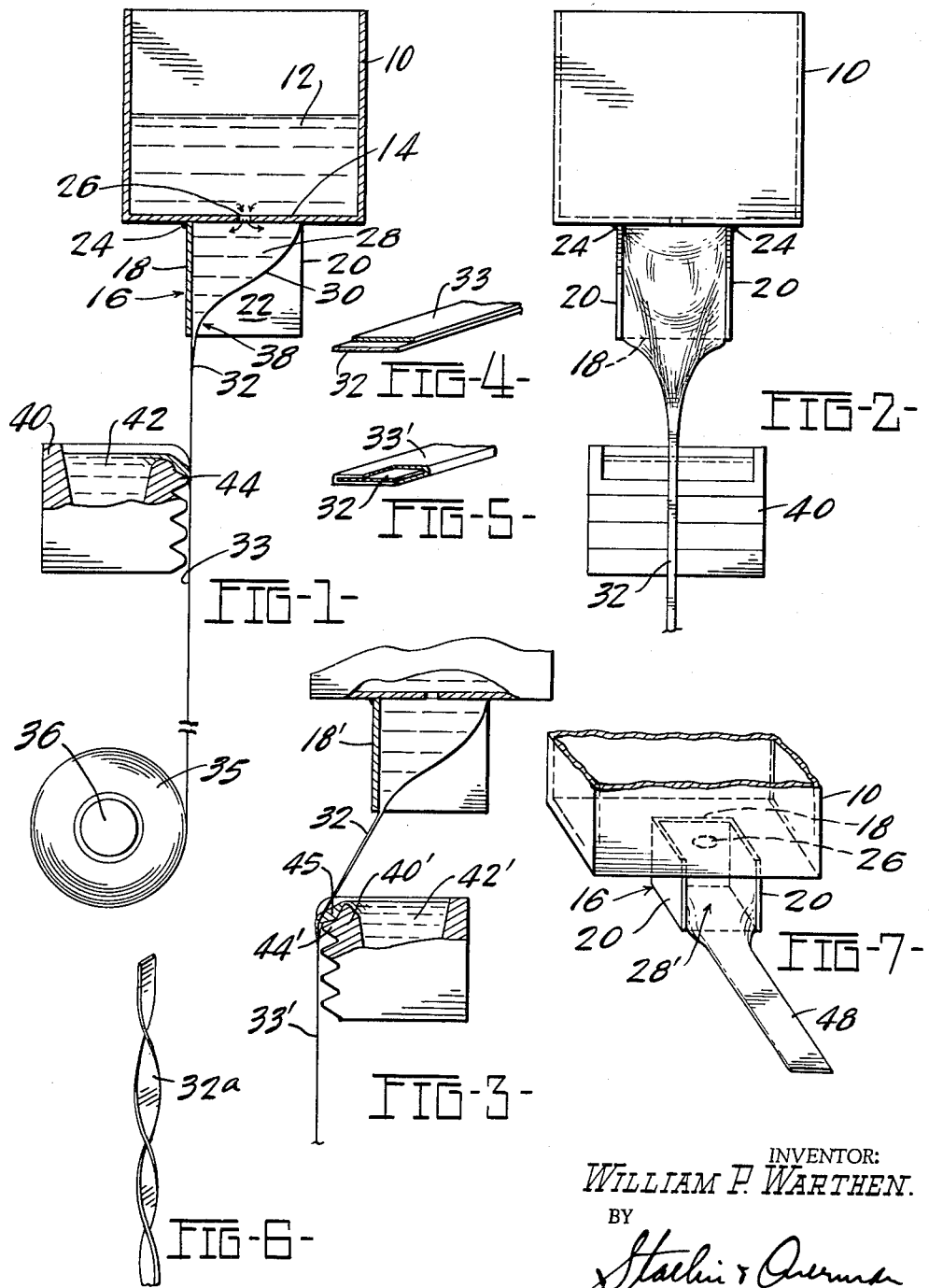

1

3,231,459
ATTENUATED MINERAL FILAMENTS
William P. Warthen, Spartanburg, S.C., assignor to Owens-Corning Fiberglas Corporation, a corporation of Delaware
Original application Sept. 11, 1957, Ser. No. 683,278, now Patent No. 3,010,146, dated Nov. 28, 1961. Divided and this application Mar. 17, 1961, Ser. No. 96,568
2 Claims. (Cl. 161—177)

This invention relates to mineral fibers or filaments of ribbon-like shape formed of heat-softenable mineral materials and to a method and apparatus for producing same by attenuation. This application is a division of my copending application Serial No. 683,278, filed September 11, 1957, now issued into Patent 3,010,146.

Attempts have been made to fashion mineral materials into flat fibers or filaments of noncircular cross-section but such endeavors have not been successful by reason of the inherent characteristic of molten mineral material such as glass in a plastic or flowable state to assume the configuration of circular cross-section. This condition obtains even though the molten mineral material is discharged or extruded through orifices of noncircular cross-section, the surface tension and molecular interadhesion being of sufficient magnitude to cause the material to immediately form a substantially circular cylindrical body or stream. By reason of this characteristic, fibers or filaments formed from heat-softened mineral materials by attenuation have been of substantially circular cross-section.

Ribbon or film glass of a thickness of a few microns has been produced by methods involving the delivery of a tubular stream of softened glass between mechanically driven rolls which squeeze the tubular formation to a flat film, one method of this character being disclosed in the Slayter and Snow Patent 2,457,785 granted December 28, 1948. Another method involves flowing or drawing glass in the form of a thin walled cylinder which is broken into small flakes. Attempts have been made to produce a thin ribbon of glass through the use of drawing rolls but it has been found that the glass stream tends to "neck in" to a fraction of its initial width and there is a tendency for the formation of a bead or ridge to be formed along the edges due to surface tension, and such attempts have resulted in failure. As far as I am aware attempts to produce flat fibers or filaments by direct attenuation from a stream of molten mineral material have heretofore been unsuccessful.

The present invention embraces a method of successfully forming fibers, filaments or thin films of mineral material of noncircular cross-section by direct attenuation of a stream of the material.

An object of the invention embraces the provision of a method of forming flat fibers, continuous filaments or film by establishing differential thermal conditions in different regions in a body of mineral material and attenuating material from the body.

An object of the invention resides in a method involving feeding heat-softened material to a partially confined zone to establish differential thermal conditions in the material with consequent variations in viscosity in different regions in the material and attenuating the material to form filaments, fibers or film of noncircular cross-section.

Another object of the invention is the provision of a method wherein molten filament or film-forming material is delivered to a walled region having an open area and the material suspended in said region subjected to differential cooling enabling the attenuation of the material into a linear body of substantially rectangular cross-section.

2

Another object of the invention is the provision of an apparatus for flowing fiber or film forming material from a supply to a generally cubically shaped region having an open area in which region the material is suspended and the material at the open area cooled at an increased rate whereby the material may be drawn into a linear body of a width greater than its thickness.

Another object of the invention is the provision of a method and apparatus for producing flat fibers from heat-softened mineral material and coating one or more surfaces of the fibers with a suitable metal or alloy concomitantly with the attenuation operation whereby the metal coating is fixedly bonded to the fibers.

A further object of the invention resides in a method of forming mineral material into flat fibers which may be twisted during attenuation to form a spirally shaped fiber.

Another object is the provision of a method and apparatus for thermally controlling a body of fiber or film-forming material to establish thermal differentials in different regions of the body of material whereby the same may be drawn or attenuated into flat fibers or film of substantially uniform thickness.

Still a further object of the invention is the provision of an apparatus adaptable for attenuating a body of heat-softened material into a flat continuous filament or fiber by winding the attenuated film or fiber upon a collet moving at high speed whereby flat fibers of extreme fineness may be efficiently produced with inexpensive equipment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic view with certain parts shown in section illustrating a type of apparatus for forming flat fibers or film from heat-softened mineral material;

FIGURE 2 is a front elevational view of the arrangement shown in FIGURE 1;

FIGURE 3 is a view similar to FIGURE 1 illustrating a method of applying a coating or layer of metal or other material to completely surround a flat filament or fiber;

FIGURE 4 is a fragmentary isometric view of a flat fiber illustrating a coating of metal on one major face thereof;

FIGURE 5 is an isometric view illustrating a flat fiber completely coated with metal or other material;

FIGURE 6 is a fragmentary view showing a flat fiber oriented in a spiral or twisted formation, and FIGURE 7 is a semidiagrammatic view illustrating the method of forming comparatively thin film of heat-softened material by attenuation.

The method and apparatus of the invention are especially adapted for producing flat or ribbon-like continuous filaments, fibers or film from heat-softenable minerals, such as glass, slag, or fusible rock. However, it is to be understood that the principles involved in the formation of flat filaments, fibers or film may be utilized for the production of linear bodies of other noncircular cross-sectional configurations through the establishment of thermal differentials in various regions of a body or quantity of material from which the linear bodies are drawn or attenuated.

Referring to the drawings in detail, a form of apparatus is illustrated for carrying out the method of the invention which includes a receptacle, tank or feeder 10 containing a supply 12 of heat-softened glass or other fiber or film-forming mineral material. The receptacle 10 may be a forehearth connected with a melting furnace in which glass batch is reduced to a molten state or in the form of an independent feeder receptacle adapted to be heated by electrical energy in a conventional manner. When a heated feeder is utilized, the fiber or film-forming material is preferably delivered into the receptacle as preformed marbles or spheres which are reduced to molten or a flowable state by heat applied to the feeder.

The glass in the feeder or receptacle is delivered to a partially confined zone configurated or shaped to set up thermal or temperature differentials to modify the viscosity of the material in different regions thereof whereby a linear body of noncircular cross-section may be drawn from the material. Disposed beneath the floor 14 of the receptacle 10 is a member or shield 16 which, in the embodiment illustrated is of three-sided configuration including a rear wall 18 and spaced side walls 20.

The walls or fins 18 and 20 define or establish a reservoir or chamber 22 of generally cubical shape as the walls 18 and 20 are substantially square. The walls are welded as at 24 or otherwise securely joined to the bottom wall or floor 14 of the receptacle 10 as shown is FIGURES 1 and 2. An orifice or passage 26 is formed in the bottom wall 14 through which glass 12 or other mineral material from the receptacle flows into the chamber or partially confined zone 22. The glass in the receptacle is maintained at a temperature rendering the glass quite viscous although flowable.

In carrying on fiber or film-forming operations the operator, through the use of a suitable tool, diverts or deflects the heat-softened glass flowing through the orifice 26 into contact with the inner surfaces of the walls 18 and 20 and the lower surface of bottom wall 14 of the receptacle to wet the walls so that the flowable glass will adhere to the wall surfaces. This action floods the chamber 22 with the glass to form a body or quantity 28 of glass in the chamber which, during attenuating operations, assumes a configuration of the general contour as indicated in FIGURE 1.

The glass or material in the feeder or receptacle 10 is maintained at a temperature whereby the viscosity of the glass in the chamber 22 is such that the glass is suspended from the walls. In the embodiment illustrated in FIGURES 1, 2, 3 and 7, the rear wall 18 and the side walls 20 are substantially square and hence define a reservoir, chamber or region 22 which is substantially cubical in shape, the fourth side and bottom being open or unrestricted.

Through the provision of an open sided reservoir, the surface 30 of the body of glass 28 in the reservoir, is exposed to direct contact with the ambient air while the remaining surface regions of the body of glass 28 are in contact with the central region of the bottom wall 14 of the receptacle and the interior surfaces of the rear and side walls 18 and 20 forming the shield. Direct contact of the surface region 30 of the body of glass 28 with the air chills or reduces the temperature of the glass at the region 30 at a faster rate than the regions of the glass in contact with the walls 18 and 20.

Hence thermal differentials are set up in different regions of the body of glass 28 establishing varying viscosities therein whereby the glass may be drawn or attenuated from the reservoir 22 into a linear body, filament, fiber or film of noncircular cross-section.

As illustrated in FIGURE 1, the glass or other fiber or film-forming material 28 is drawn or attenuated from the region at the lower terminus of the rear wall 18 in forming a linear body, the rear wall 18 being of planar shape and the attenuated linear body or filament 32 of flat or rectangular cross-section as shown in FIGURE 4.

The fiber or filament 32 is attenuated by being wound around a collet 35 mounted upon a rotating arbor 36, the collet being rotated at a desired speed by a motor (not shown) to secure a fiber or filament of desired size.

The principles involved in the method of successfully forming a linear body, filament or fiber of noncircular cross-section through the use of the apparatus disclosed are as follows: The body of glass 28 is of a viscous constituency so that it is supported and suspended by adhesion to the walls of the shield 16. The exposed surface region 30 of the body of glass 28 is cooled and its temperature reduced by contact with the ambient air at a faster rate than those regions of the body in contact with the walls 18 and 20.

This cooling action substantially increases the viscosity of the glass at the surface region 30 and tends to retard the "necking in" of the glass being drawn from the terminus of the rear wall 18 of the shield as the glass at the surface region 30 converging at the region indicated at 38 approaches a state of solidification. This condition provides substantial resistance to flow of the glass and is sufficient to prevent the natural or inherent tendency for glass to gravitate to a circular cross-section.

The glass in contact with the walls 18 and 20 is at higher temperatures and hence lower viscosities and flows into convergence with the more viscous glass at the region 38 from which the filament or body is drawn or attenuated. As shown in FIGURE 2, the glass is drawn from a transverse linear zone provided by the terminus of the planar wall 18 and as the glass leaves the wall 18 it is of rectangular cross-section and is solidified by further contact with air into a flat linear body or filament 32. Several factors affect the cross-sectional configuration, the width and thickness of the attenuated body or filament. The viscosity of the body of glass in the reservoir 22 should be high enough to maintain a condition of constant flooding in the region defined by the walls 18 and 20, as the space between the side walls 20 must be filled with softened glass and the walls 18 and 20 wetted by the glass in order to secure a flat filament or fiber. It is believed that the tendency for the glass to wet over the surface of the wall 18 including the terminus region thereof from which the filament is drawn is an important factor in forming the flat filaments or fibers. The linear rate of attenuation in a large measure determines the width and thickness of the attenuated body.

As an operating example, an apparatus is employed wherein the walls 18 and 20 are each substantially $\frac{1}{2}''$ square and the passage or orifice 26 in the floor of the receptacle 10 is approximately $\frac{1}{16}''$ in diameter. By attenuating the body, filament or fiber at the rate of upwards of ten thousand linear feet per minute, a flat ribbon-like continuous filament or fiber of a thickness of two or more microns and of a width approximately eight to twelve times its thickness is formed.

By varying the operating factors above-mentioned, the thickness and width of the attenuated filament or fiber may be varied and controlled. The relative dimensions of the rear and side walls of the shroud 16, and the spacing between the side walls, may be varied to modify the width and thickness of the flat filament.

Furthermore, while the configuration of the shield 16 illustrated is particularly adapted to form flat, ribbon-like filaments or fibers the major surfaces of which are in parallelism, it is to be understood that the shape of the walled shroud or shield 16 may be modified to produce attenuated linear bodies of other noncircular cross-sectional configurations. Variations in cross-sectional configuration may be obtained by varying the thermal differential between the glass at the region indicated at 30 in FIGURE 1 and that adjacent or in contact with the inner surfaces of the walls 18 and 20 by directing a controlled air stream toward the exposed region 30 of the glass 28 in the zone 22.

The flat, ribbon-like fibers or filaments produced by the method and apparatus above described may be surface coated with other materials, such as metals, metal alloys or other glasses. FIGURE 1 illustrates an arrangement for applying a coating of metal to one face or surface of a flat filament 32. Disposed adjacent the filament 32 is a receptacle 40 adapted to contain a supply of molten metal 42. The receptacle 40 is formed with a lip 44 which is positioned adjacent the path of movement of the flat filament 32.

The molten metal 42 flows from the supply in the receptacle onto the lip 44, the adjacent flat surface of the fiber 32 engaging the molten metal on the lip 44 whereby during linear movement of the filament, one surface thereof is coated with the metal. The transfer of the molten metal onto the filament is effected by a wiping action enhanced by the inherent characteristic of glass to acquire a coating on a nascent surface.

Metals that have been found suitable for coating the filaments or fibers are aluminum, chromium, zinc, lead or the like. The winding collet 35 is spaced a distance sufficient from the region of application of the coating to the filament so that the metal is completely set or solidified before the coated filament is wound onto the collet. FIGURE 4 illustrates a flat fiber 32 with a metal coating 33 thereon. The metal coating is preferably applied to the filament at or just prior to the point of complete attenuation or solidification of the glass.

FIGURE 3 is illustrative of an arrangement similar to FIGURE 1 for completely coating a flat filament or fiber with metal. In this arrangement, the receptacle 40' contains molten metal 42' which flows onto a lip 44' providing a quantity of the coating metal at 45. The filament 32 is pulled or drawn through the meniscus of metal 45 so that both major surfaces and the edge regions receive a coating 33' of the metal. In order to effect a complete coating on the flat filament 32, the filament is drawn away from the terminus of the wall 18' in an angular direction as shown in FIGURE 3, to completely immerse the filament in the metal supported on the lip 44'. FIGURE 5 illustrates the flat fiber or filament 32 completely embedded in or surrounded by the metal coating 33'.

The coated or uncoated flat continuous filament may be twisted prior to its collection upon a winding collet. The twisting of the flat filament or fiber may be accomplished by passing the filament through a rotating guide (not shown) having a transversely elongated opening in the axial region thereof to accommodate the flat filament.

By rotating the guide, the wall surfaces defining the elongated slot in the guide engage and twist the filament to the configuration shown at 32a in FIGURE 6. The amount of twist or spiral configuration imparted to the fiber or filament 32a may be modified by varying the speed of rotation of the twisting guide or varying the ratio of speed of rotation of the winding collet 35 to that of the twisting means.

The arrangement of receptacle 10 and the chamber 22 provided by the walls or fins 18 and 20 may be utilized to produce thin film glass of substantial width in the manner shown in FIGURE 7. In forming film glass, the glass of the body 28' contained in the reservoir or chamber 22 is preferably drawn in a substantially horizontal or lateral direction from the shield 16.

In forming film glass in the manner illustrated in FIGURE 7, both the surface regions of the body of glass 28' exposed to the ambient air through the open side and the open bottom region of the shield are chilled and the viscosity increased so that during attenuation of the film 48, the chilled regions are drawn into coextensive converging relation and by reason of the increased viscosity, the linear body or film does not "neck in" appreciably.

Thus, a glass film of a width only slightly less than the transverse dimension between the walls 20 is formed the thickness and width of the film being determined in a large measure by the initial viscosity of the glass 28' in the chamber 22, the extent of temperature reduction or chilling of the exposed regions of the body of glass 28' and the rate of linear attenuation of the film. The film may be attenuated by pull rolls or other suitable means.

The attenuated film 48 may be coated with metal on one or both surfaces by feeding molten metal onto the film. The molten metal is preferably applied to the film before attenuation is complete in order to improve the adhesion between the molten metal and the glass.

While a single filament or fiber attenuating unit is illustrated, associated with the receptacle 10, it is to be understood that a substantial number of units 16 may be secured to a glass feeder or bushing associated with a forehearth of a glass melting furnace whereby a substantial number of flat filaments or fibers may be formed concomitantly.

The flat filaments or fibers are adaptable for many and varied uses. The uncoated fibers may be processed into filter mats to obtain improved filtering efficiency. For example, the flat filaments or fibers may be oriented in a general pattern with their major surfaces facing in the same direction and in overlapping relation. This orientation causes a greater turbulence of the air or other gas passing through the filter in directions generally normal to the major surface of the filaments and enhances the removal of foreign matter. Flat filaments may be used for polarization or light channeling purposes.

The metal coated flat filaments or fibers are adaptable for many uses. For example, coated fibers may be used for decorative purposes. When coated on one side with metal, they are highly reflective and become miniature mirrors. The spiral fibers, both coated and uncoated are useful for decorative purposes. Metal coated fibers may be processed into mats having high insulating efficiency. By orienting the metal coated surfaces of the fibers whereby they face generally in one direction in a mat, the coated surfaces, being heat reflective, provide reflective insulating properties in addition to the conventional insulating characteristics of a fibrous mat.

The method of the invention may be employed in forming laminated units suitable for electrostatic condensers. For example, two flat filaments may be concomitantly formed, one of the filaments coated with metal on one face and the two fibers brought into engaging relation with the metal disposed between the fibers providing a glass and metal laminate. Metal coated filaments may be employed in producing electrostatic filters, high frequency signal reflection, or electromagnetic energy reflection and for current conducting purposes.

The film glass formed by the method exemplified in FIGURE 7 may be coated with metals or other glass by feeding the coating materials to the softened glass within the region defined by the walls 18 and 20 or applied to the film at or in advance of the zone of complete attenuation.

Curly filaments may be produced by feeding a coating glass having a different coefficient of expansion onto the filaments in softened condition.

It is apparent that, within the scope of the invention, modifications and different arrangements may be made other than is herein disclosed, and the present disclosure is illustrative merely, the invention comprehending all variations thereof.

I claim:

1. An article of manufacture comprising an attenuated filament of mineral material of substantially rectangular cross-section of a width of approximately eight to twelve times its thickness, and a coating of metallic material surrounding and bonded to the filament.

2. An article of manufacture comprising an attenuated glass filament of rectangular cross-section of a width of approximately eight to twelve times its thickness and of spiral configuration in the direction of its length.

(References on following page)

References Cited by the Examiner

UNITED STATES PATENTS

| | | | |
|---|---|---|---|
| 2,276,615 | 3/1942 | Hazlett | 49—17 |
| 2,386,511 | 10/1945 | Slayter et al. | 49—17 |
| 2,457,785 | 12/1948 | Slayter et al. | 49—17 |
| 2,509,845 | 5/1950 | Slayter | 49—17 |
| 2,578,986 | 12/1951 | Schoonenberg | 18—54 |
| 2,699,415 | 1/1955 | Nachtman | 18—8 |
| 2,708,813 | 5/1955 | Bourgeaux | 18—8 |
| 2,714,569 | 8/1955 | Prindle et al. | 28—82 |
| 2,772,518 | 12/1956 | Whitehurst et al. | 117—126 |
| 2,789,064 | 4/1957 | Schladitz | 117—126 |
| 2,825,260 | 3/1958 | O'Brien | 28—82 |
| 2,880,551 | 4/1959 | Martuscello et al. | 18—54 |
| 2,909,151 | 10/1959 | Kahn | 117—126 |
| 2,963,739 | 12/1960 | Whitehurst et al. | 117—126 |
| 2,976,177 | 3/1961 | Warthen | 117—126 |
| 2,993,301 | 7/1961 | Muller et al. | 49—17 |
| 3,073,005 | 1/1963 | Tiede | 28—82 |
| 3,076,324 | 2/1963 | Morgan | 65—3 |

DONALD W. PARKER, *Primary Examiner.*

RICHARD D. NEVIUS, RUSSELL C. MADER,
*Examiners.*